United States Patent [19]

Wagner

[11] Patent Number: 4,583,362

[45] Date of Patent: Apr. 22, 1986

[54] EXPANDER-CYCLE, TURBINE-DRIVE, REGENERATIVE ROCKET ENGINE

[75] Inventor: William R. Wagner, Los Angeles, Calif.

[73] Assignee: Rockwell International Corporation, El Segundo, Calif.

[21] Appl. No.: 725,150

[22] Filed: Apr. 22, 1985

Related U.S. Application Data

[63] Continuation of Ser. No. 560,674, Dec. 12, 1983, abandoned.

[51] Int. Cl.$^4$ ............................................. F02K 9/00
[52] U.S. Cl. ................................... 60/259; 60/260; 60/267
[58] Field of Search ............... 60/260, 266, 267, 257, 60/258, 259, 39, 461

[56] References Cited

U.S. PATENT DOCUMENTS

| | | | |
|---|---|---|---|
| 2,763,126 | 9/1956 | Halford et al. | 60/259 |
| 2,906,091 | 9/1959 | Kretschmer | 60/259 |
| 3,017,745 | 1/1962 | Shirley et al. | 60/259 |
| 3,028,729 | 4/1962 | Ledwith | 60/266 |
| 3,048,966 | 8/1962 | Feraud et al. | 60/267 |
| 3,049,870 | 8/1962 | Chamberlain | 60/260 |
| 3,561,217 | 2/1971 | Hall | 60/260 |
| 3,613,375 | 10/1971 | Abild | 60/267 |
| 4,073,138 | 2/1978 | Beichel | 60/259 |
| 4,369,920 | 1/1983 | Schmidt | 60/265 |
| 4,379,679 | 4/1983 | Guile | 417/54 |

FOREIGN PATENT DOCUMENTS 1950407 4/1971 Fed. Rep. of Germany ........ 60/259

OTHER PUBLICATIONS

Beichel, "Propulsion Systems for Single-Stage Shuttles" *Astronautics & Aeronautics,* Nov. 1974, pp. 32–39, see pp. 37 & 36.

Primary Examiner—Louis J. Casaregola
Assistant Examiner—Donald E. Stout
Attorney, Agent, or Firm—H. Fredrick Hamann; Harry B. Field

[57] ABSTRACT

A heat-regenerative, expander-cycle, turbine-drive rocket engine 26 in which heated oxidizer gas is used to drive the fuel and oxidizer turbines 16 and 20. The hot exhaust gas from the oxidizer turbine 20 is passed through a heat-donor coil 36 of a heat exchanger 24 where it passes heat to the oxidizer flowing through a donee coil 34 to preheat the oxidizer liquid and gasify it before it is passed through the cooling jacket 28 of the rocket engine 26 where it cools the engine 26 and is itself heated to a higher temperature. The oxidizer, e.g., $N_2O_4$, is brought to higher temperature and pressure than its supercritical temperature and pressure so that flashing and boiling of the oxidizer are avoided.

10 Claims, 4 Drawing Figures

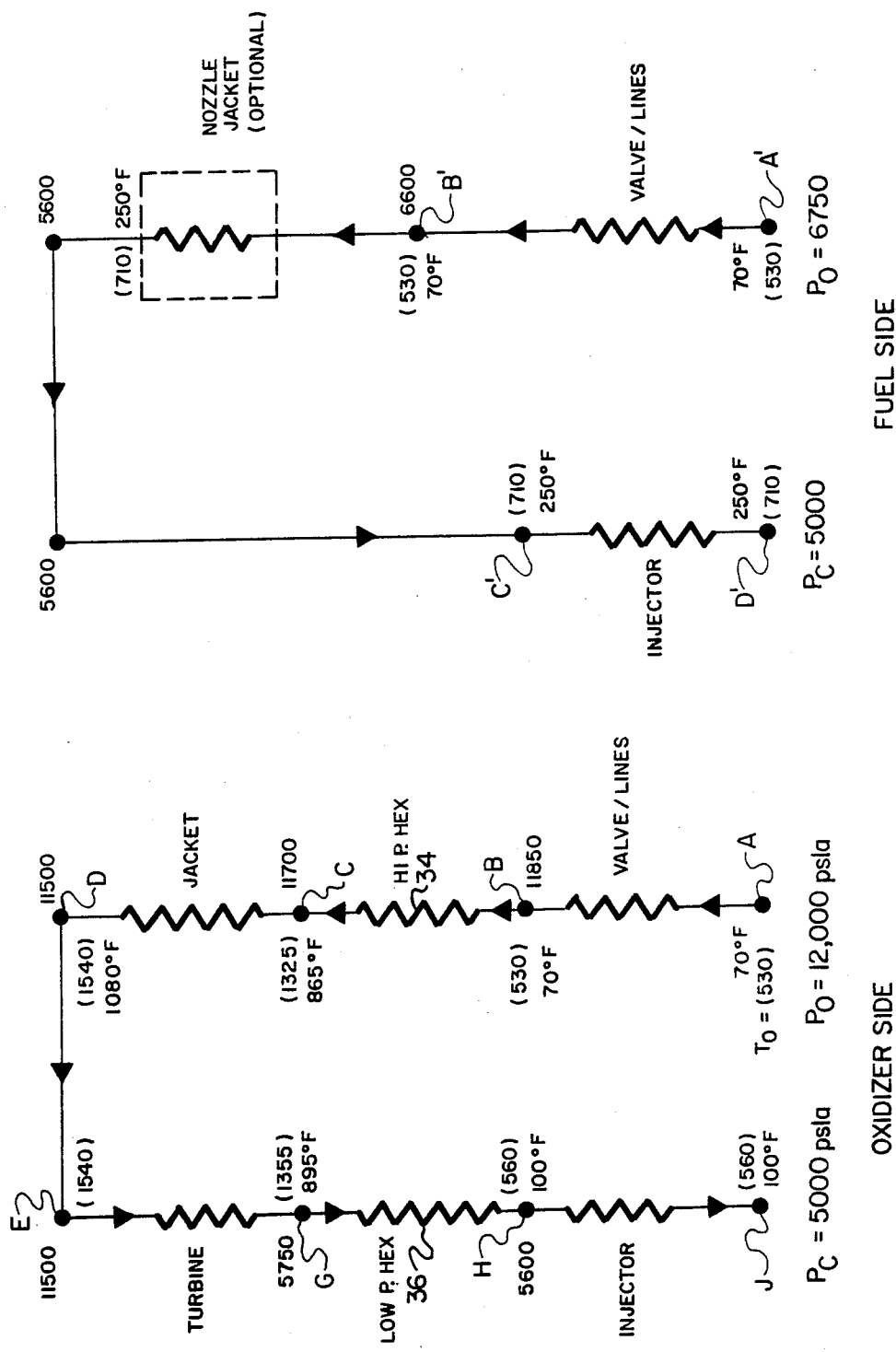
Fig. 3. OXIDIZER SIDE
Fig. 4. FUEL SIDE

EXPANDER-CYCLE, TURBINE-DRIVE, REGENERATIVE ROCKET ENGINE

This is a continuation of co-pending application Ser. No. 560,674 filed on Dec. 12, 1983, now abandoned.

BACKGROUND OF THE INVENTION

1. Field of the Invention

This invention relates to liquid-propellant, expander-cycle rocket engines and especially to such engines which use a regenerative system for heating the oxidizer which drives the propellant turbines.

2. Description of the Prior Art

The evolution of rocket engines has led to a demand for and development of engines providing higher and higher output thrust. To develop higher thrust in rocket engines, higher pressure in the combustion chamber is required, since output thrust is directly related to chamber pressure and this, in turn, requires higher propellant flow rates.

Provision of propellants at higher flow rates has been accomplished in the past by gas-generator engines and by expander-cycle, heated fuel-drive engines. The simple gas-generator engine uses a portion of the fuel to generate gas to drive the propellant drive turbine and the turbine exhaust is directed into the expansion section of the nozzle. A second type of gas generator is the staged-combuston monopropellant gas generator. A third type is the staged-combustion, fuel- or oxidizer-rich preburner in which both fuel and oxidizer are burned. Gas generators are basically unsafe since they burn fuel, or fuel and oxidizer, and can generate high temperatures which can cause the engines to explode or burn up associated downstream turbines and components if they operate off design conditions. Gas-generating preburners also require a variety of associated equipment, such as high-pressure valves, controls, ignition systems, sensors, combustors and injectors, which adds weight, complexity, unreliability and cost to rocket engines.

The oxidizer expander-cycle engine described herein can be used to provide the heated gas necessary for driving the propellant turbine. This engine heats the oxidizer in the cooling jacket of the engine nozzle and utilizes the turbine exhaust gas to preheat the oxidizer in a heat exchanger, or regenerator, before the oxidizer is fed through the cooling jacket of the engine. The oxidizer expander-cycle engine has the high-performance potential of the fuel-rich or oxidizer-rich staged-combustion engine without the disadvantges of the gas-generator preburner engines. The present invention constitutes an improved expander-cycle engine using an oxidizer-driven turbine.

OBJECTS OF THE INVENTION

An object of the invention is to provide a storable liquid propellant, high-pressure, expander-cycle rocket engine which, in relation to present engines, is safer, simpler, more reliable, lighter, higher in performance and less expensive.

Other objects, advantages and novel features of the present invention will become apparent from the following detailed description of the invention when considered in conjunction with the accompanying drawing.

SUMMARY OF THE INVENTION

The objects and advantages of the present invention are achieved by the use of an expander-cycle, turbine-drive rocket engine in which the hot turbine exhaust gas is passed through a regenerator to raise the temperature of the cool oxidizer liquid before the oxidizer is fed into the cooling jacket of the engine to be raised to the proper temperature for driving the turbine.

In addition, the turbine drive fluid, or oxidizer, is selected for its earth-storage capability and for endothermic, dissociative and other characteristics which make it a good fluid for driving a turbine and cooling the engine at comparatively low operating temperatures.

BRIEF DESCRIPTION OF THE DRAWINGS

FIG. 3 is a schematic illustration of the temperatures and pressures at various points in the oxidizer flow path of the engine shown in FIG. 1.

FIG. 4 is a schematic illustration of the temperatures and pressures at various points in the fuel flow path of the engine shown in FIG. 1.

DETAILED DESCRIPTION OF THE PREFERRED EMBODIMENTS

The following exemplary description of the invention will refer specifically to a rocket engine which uses mono-methyl hydrazine (MMH), formula ($CH_3N_2H_3$), as a fuel and nitrogen tetroxide (NTO), formula ($N_2O_4$), as an oxidizer.

The oxidizer is also utilized as the turbine drive fluid and as the combustor cooling fluid in this invention. It is fortunate that NTO, which is used as a propellant along with MMH in many rocket engines, has good earth-storage and turbine-drive fluid properties. NTO is storable for indefinite periods of time at a temperature range of about $-60°$ to $130°$ F. As a turbine-drive fluid, it turns into a gas at about $300°-500°$ F., which is in the range of rocket-engine operating temperatures; it absorbs heat (endothermic) when it changes phase (liquid to gas) so that it can be used as a cooling fluid for the engine; it has good properties (e.g., specific heat and gas constant values) in the desired usable range of temperatures (i.e., approximately $800°-1500°$ F.) for a turbine-drive gas. Also, this oxidizer is compatible with metal surfaces.

Figure 1:
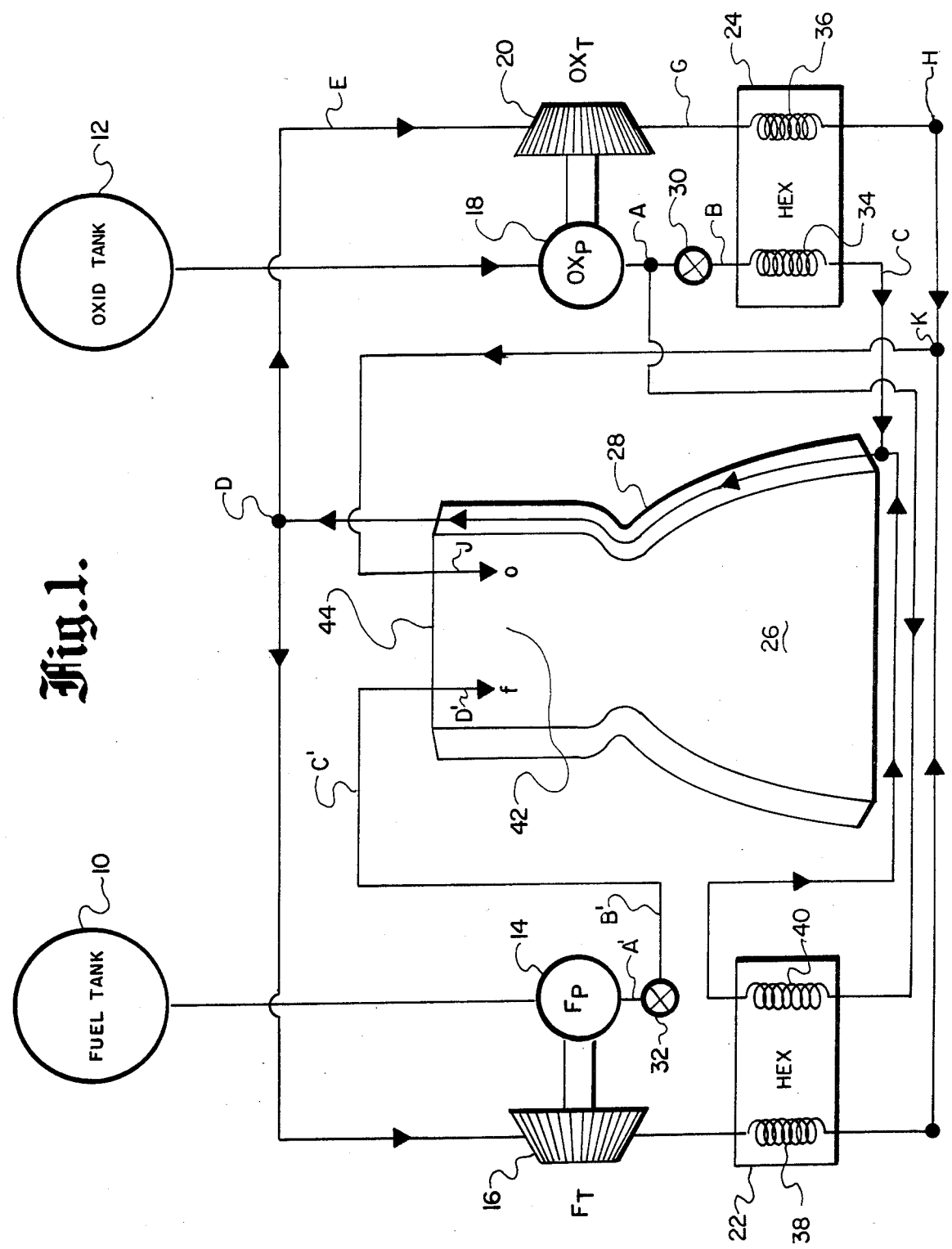
FIG. 1 is a schematic diagram of an embodiment of an expander-cycle turbine-drive rocket engine which utilizes parallel turbines for driving the fuel and oxidizer pumps.

FIG. 1 shows an embodiment of an expander-cycle, turbine-drive, regenerative rocket engine in accordance with the present invention. The system comprises a pressurized fuel (MMH) tank 10, a pressurized oxidizer (NTO) tank 12, a fuel pump 14 and its drive turbine 16, an oxidizer pump 18 and its drive turbine 20, a fuel turbine regenerator (heat exchanger) 22, an oxygen turbine regnerator 24, a rocket engine 26, and a cooling jacket 28 around the rocket engine 26.

The turbines require hot gas for rotation and thus do not initially operate. The oxidizer tank 12 contains oxidizer which is pressurized somewhat above the saturation pressure of the oxidizer (NTO). The pressure forces some of the oxidizer through the pump 18, the cooling jacket 28 and the piping into the combustion chamber. The pressure in the fuel tank 10 similarly forces some of the fuel into the combustion chamber 42. The engine 26 is started by hypergolic reaction in the combustor and heats up to a temperature (300°-500° F.) at which the liquid oxidizer (NTO) in the pipe which passes through the cooling jacket 28 changes phase and becomes a gas. The heat energy is transferred to the rest of the liquid oxidizer and the hot gas which results causes the turbines to rotate. The hot exhaust gas from each turbine 16 and 20 is passed through its respective regenerator, or heat exchanger (HEX), 22 and 24 to preheat the liquid oxidizer coming from the oxidizer pump 18.

As seen in FIG. 1, the path of the oxidizer in a parallel-turbine rocket engine is as follows: from the oxidizer tank 12 through the oxidizer pump 18, through a valve 30, through the high-pressure, or heat-donee, coil 34 of a HEX 24, through the cooling jacket 28 of the rocket engine 26, to point D where it divides to drive the turbine 20 and 16 in parallel. From oxidizer turbine 20 the oxidizer flows through the low-pressure, or heat donor, coil of the oxidizer-side HEX 24 to point K where it meets the oxidizer flow coming from the fuel turbine 16 through the heat-donor coil 36 of the fuel-side HEX 22. Fron point K the oxidizer flow goes through an injector 44 into the combustion chamber 42 of the rocket engine 26. A parallel path exists for the oxidizer coming out of the oxidizer pump 18 to the heat-done coil 40 in the fuel-side Hex 22 and then through the oxider pipe which goes through the cooling jacket 28 of the engine.

The path of the fuel is from the fuel tank 10 through the fuel pump 14, through the fuel valve 32, and through the injector 44.

FIG. 3 is a schematic showing pressures (psia) and temperatures in both the Rankine and Fahrenheit scales at various points along the oxidizer flow path after the engine has come up to normal operating temperature, (Rankine values are enclosed in parentheses and Fahrenheit temperatures are denoted by °F.). The oxidizer pump 18 provides 12,000 psia at point A, just beyond the pump 18, the temperature here being atmospheric temperature, 70° F. At point B, just beyond the valve 30, the temperature is the same but the pressure has dropped slightly to to 11,850 psia. After flowing through the donee coil 34 of the oxidizer-side HEX 24 where heat is added from the donor coil 36, the temperature rises to 865° F. and the pressure drops to 11,700 psia. The oxidizer is now sent through the cooling jacket 28 of the engine 26 where it acts to cool the engine somewhat and in the process absorbs enough heat to raise its temperature. Thus, after it leaves the engine (point D), its temperature is 1080° F. and its pressure is 11,500 psia. This is well above the supercritical temperature and pressure of the $N_2O_4$ oxidizer so that it is a very stable hot gas at this point and therefore a very good driving fluid for the two turbines 20 and 16. After passing through the turbines (point G), the temperature and pressure have dropped to 895° F. and 5750 psia, respectively. This temperature is higher than needed in the combustion chamber 42 and, therefore, the oxidizer is used in the HEX's 22 and 24 to heat the portions of oxidizer in the heat-donee coils 40 and 34 from 70° F. to 865° F. before the oxidizer is heated in the cooling jacket 28.

The fuel is pressurized in the fuel tank 10 to a pressure which drops to 6750 psia (see FIG. 4) at point A' just after the fuel pump 14. The temperature of the fuel at this point and in the tank 10 is 70° F. The temperature remains the same, but the pressure drops slightly to 6600 psia at point B' after passage through the fuel-line valve 32. The fuel line can then be brought directly to the injector 44 or, if desired, may be passed through a short section of the cooling jacket 28 (this is not shown in FIG. 1, but is indicated as "optional" in FIG. 4). If the fuel is passed through the cooling jacket 28, its temperature is raised to about 250° F. and its pressure reduced from that at point B'. After passing through the injector 44, its temperature is 250° F. and its pressure is 5000 psia.

Figure 2:
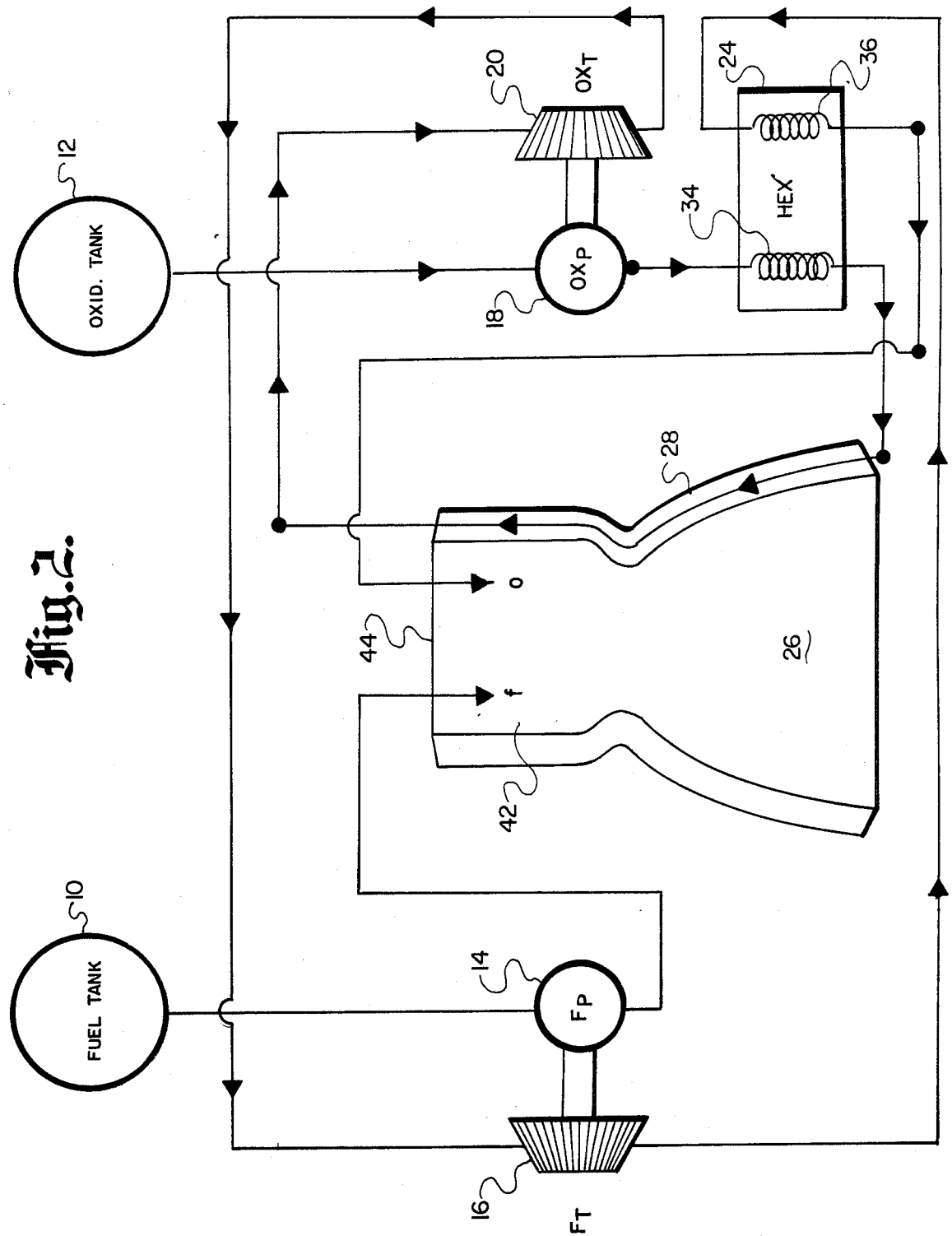
FIG. 2 is a schematic diagram of an embodiment of the invention in which the fuel and oxidizer pumps are driven from turbines which are serially driven by the hot oxidizer gas.

FIG. 2 shows a regenerative, expander-cycle rocket engine with series turbines 16 and 20 and single HEX 24. Oxidizer is pumped through the heat-donee coil 34 in the HEX 24, through the cooling jacket 28 of the rocket engine 26, then through the oxidizer turbine 20, then through the fuel turbine 16, then through the heat-donor coil 36 of the HEX 24 and through the injector 44 into the combustion chamber 42. Again, heat is transferred from the hot exhaust gas of the oxidizer and fuel turbines 20 and 16 the oxidizer fluid in the donee coil 34 to preheat it before it is sent through the cooling jacket 28 of the engine 26.

The above system as embodied in FIGS. 1 and 2 heats lower-temperature oxidizer in the cooling jacket 28 where it is raised to a higher temperature of about 1080° F. Passing the lower-temperature oxidizer through the cooling jacket 28 serves to cool the engine 26 as well as to further heat the oxidizer gas.

The oxidizer is subjected to above-supercritical temperature and pressure, viz., 1080° F. and 11,500 psia after leaving the cooling jacket (e.g. point D in FIG. 1). The oxidizer is also above supercritical temperature and pressure, viz., it is at 865° F. and 11,700 psia, after leaving the donee coil 34 (point C in FIG. 3). (Supercritical temperature and pressure for $N_2O_4$ are 316.4° F. and 1435 psia.) This permits the oxidizer to change phase without flashing or boiling. Boiling and flashing would result in uncertain, unstable flow, pressure oscillations which would vibrate the engine, and uncertain and poor performance. Higher than supercritical temperature is first attained by heating the oxidizer in the donee coil 34 and in the cooling jacket 28 and higher than supercritical pressure is provided by the oxidizer pump 18.

Other types of oxidizer may be used if their characteristics are suitable. For example, other types of nitrogen-oxygen compounds having the general formula $N_xO_y$, where x and y are integers, may be employed if their properties are correct. Other types of fuel which will combust with these oxidizers may also be employed.

A HEX which may be employed is the internal plate stack (IMPS) HEX which is a product of the Rocketdyne Division of Rockwell International Corporation of Canoga Park, California. This HEX consists of stacked identical plates wherein every other plate is reversed 180° so that a counterflow is present between alternate plates. The design provides a "hot" plate and "cold" plate stack with a heat transfer of up to 90% of the maximum possible.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a heat-regenerative, expander-cycle turbine drive for a rocket engine having a combustor, an oxidizer tank, an oxidizer turbine, an oxidizer pump and a cooling jacket around said engine, wherein oxidizer fluid, being of the type described by the general formula $N_xO_y$ where x and y are integers, is passed from the oxidizer tank through the oxidizer pump, through the cooling jacket where the oxidizer fluid is heated to a high temperature, and through the oxidizer turbine as a driving fluid, the improvement comprising:

a heat-exchanger having a heat-donor coil in heat exchange relationship with a heat-donee oil, wherein said donor coil is connected between the oxidizer turbine and the engine combustor for receiving said driving fluid and wherein said donee coil is connected between the oxidizer pump and the cooling jacket for receiving the oxidizer fluid from the oxidizer pump, said driving fluid providing heat to the donor coil to raise the temperature of the oxidizer fluid in the donee coil, the oxidizer pump raising the oxidizer pressure above its supercritical pressure value, said donor coil, donee, coil, and oxidizer pump being so arranged and adapted that the supercritical pressure value is maintained until the oxidizer fluid is introduced into the engine for combustion and the supercritical temperature value is reached before the oxidizer fluid enters said oxidizer turbine; and means coupled to receive the oxidizer fluid from the donee coil, pass it through the cooling jacket of the engine for further heating, and feed it to the turbine for driving the turbine.

2. The improvement defined in claim 1, wherein: the temperature of the oxidizer fluid in the donee coil is raised above its supercritical temperature.

3. The improvement defined in claim 1, wherein: the temperature and pressure of the oxidizer fluid after it passes through the donee coil are above its supercritical temperature and pressure.

4. The improvement defined in claim 1, wherein: said oxidizer fluid is $N_2O_4$.

5. A heat-regenerative system for the turbine-drive fluid of an expander-cycle liquid propellant rocket engine having a fuel tank and fuel pump, an oxidizer tank and oxidizer pump, at least one turbine for driving said pumps, and a cooling jacket around said engine, wherein oxidizer fluid, being of the type described by the general formula $N_xO_y$ where x and y are integers, is passed from the oxidizer tank through the oxidizer pump, through the cooling jacket where the oxidizer is heated to a high temperature, and through the turbines as a driving fluid, said system further comprising:

heat exchange (HEX) means to which said driving fluid is coupled as an input and to which the oxidizer fluid from the oxidizer pump is coupled as another input, the HEX means being arranged to transfer heat from said driving fluid to the cooler oxidizer fluid from the oxidizer pump to raise the temperature of said oxidizer fluid from the oxidizer pump, the oxidizer pump acting to raise the pressure of the oxidizer fluid passing through it above its supercritical value, said heat exchanger means and oxidizer pump being so arranged and adapted that the supercritical pressure value is maintained until the oxidizer fluid is introduced into the engine for combustion and the supercritical temperature is reached before the oxidizer fluid enters said oxidizer turbine.

6. A system as in claim 5, wherein: said oxidizer fluid is gasified by the transfer of heat from said driving fluid.

7. A system as in claim 5, further including: means receiving said oxidizer fluid from said HEX means and passing it through the cooling jacket of said engine; and means receiving said oxidizer fluid from the cooling jacket of the engine and conducting it to the turbine to drive the turbine.

8. A system as in claim 5, wherein: said oxidizer fluid, after leaving the heat exchanger means is at a higher temperature and pressure than its supercritical temperature and pressure.

9. A system as in claim 5, wherein: said oxidizer fluid is $N_2O_4$.

10. A system as in claim 9, wherein: said fuel is MMH.

* * * * *